(12) United States Patent
Kurematsu et al.

(10) Patent No.: US 8,282,520 B2
(45) Date of Patent: *Oct. 9, 2012

(54) CHAIN TENSIONER

(75) Inventors: Yuji Kurematsu, Osaka (JP); Atsushi Hayami, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 168 days.

This patent is subject to a terminal disclaimer.

(21) Appl. No.: 12/829,706

(22) Filed: Jul. 2, 2010

(65) Prior Publication Data

US 2011/0021298 A1    Jan. 27, 2011

(30) Foreign Application Priority Data

Jul. 21, 2009 (JP) ................................ 2009-170222

(51) Int. Cl.
  *F16H 7/08* (2006.01)
  *F16H 7/22* (2006.01)
(52) U.S. Cl. ......... 474/101; 474/109; 474/110; 474/111
(58) Field of Classification Search .................. 474/101, 474/109–111, 120
See application file for complete search history.

(56) References Cited

U.S. PATENT DOCUMENTS

| | | | | |
|---|---|---|---|---|
| 3,252,347 A * | 5/1966 | Seaman | ......................... | 474/111 |
| 4,792,322 A * | 12/1988 | Goppelt et al. | ............... | 474/136 |
| 5,704,860 A * | 1/1998 | Stief | ............................. | 474/110 |
| 6,165,090 A * | 12/2000 | Simpson | ........................ | 474/110 |
| 7,455,607 B2 * | 11/2008 | Narita et al. | ................... | 474/109 |
| 2004/0266572 A1* | 12/2004 | Yoshida et al. | ................ | 474/110 |
| 2008/0280712 A1* | 11/2008 | Ryouno et al. | ................ | 474/110 |
| 2009/0017949 A1* | 1/2009 | Sato et al. | ..................... | 474/111 |
| 2009/0111628 A1* | 4/2009 | Poiret et al. | ................... | 474/110 |
| 2011/0130232 A1* | 6/2011 | Barrette et al. | ............... | 474/101 |

FOREIGN PATENT DOCUMENTS

JP    3929680    3/2007

* cited by examiner

*Primary Examiner* — Michael Mansen
*Assistant Examiner* — Minh Truong
(74) *Attorney, Agent, or Firm* — Howson & Howson LLP

(57) ABSTRACT

In a chain tensioner, an expansible ring is disposed in an internal groove formed in the inner wall of a plunger-accommodating hole near an open end thereof. The ring cooperates with grooves formed on the plunger to exert a ratchet action. The relationship between the angles of the surfaces of the internal groove and the grooves on the plunger allows the plunger to protrude, restricts retraction of the plunger on start-up of a chain transmission, but allows retraction when chain tension becomes excessive. In one embodiment, in which the ring is a C-ring, the tensioner housing can be formed with external threads for mounting in a threaded hole on a timing chain cover or other engine part. In other embodiments, the ring can have externally protruding levers for manipulation of the ring.

9 Claims, 10 Drawing Sheets

CHAIN TENSIONER

CROSS REFERENCE TO RELATED APPLICATIONS

This application claims priority under Title 35, United States Code, §119 (a)-(d) on the basis of Japanese Patent Application No. 2009-170222, filed on Jul. 21, 2009. The disclosure of Japanese Patent Application No. 2009-170222 is herein incorporated by reference in its entirety.

FIELD OF THE INVENTION

The invention relates to a chain tensioner comprising a tensioner body having a cylindrical plunger-accommodating hole with one open end and a bottom at the opposite end, and a plunger slidable in the plunger-accommodating hole, protruding therefrom, and biased in the protruding direction on order to maintain adequate tension in a circulating power transmission chain.

BACKGROUND OF THE INVENTION

An engine timing drive typically includes an endless timing chain, such as a roller chain, engaged with a crankshaft sprocket and one or more camshaft sprockets. The timing drive usually also includes a chain guide mechanism for guiding the timing chain. The mechanism includes a pivoted guide lever having a shoe in sliding engagement with the chain, and a chain tensioner having a fixed tensioner housing, and a plunger protruding therefrom for biasing the lever against the chain in order to maintain adequate tension in the chain.

Oil is supplied under pressure to a high pressure oil chamber formed by the plunger and the plunger-accommodating hole in the tensioner housing. The oil flows out of the high pressure oil chamber through a restricted space between the plunger and the wall of the plunger-accommodating hole when the chain applies a force to lever, and through the lever to the plunger, urging the plunger in the retracting direction. Because of space for flow of oil out of the high pressure oil chamber is restricted, retraction of the plunger is controlled by hydraulic damping.

On engine start-up, however, until oil pressure builds up in the high pressure oil chamber, adequate damping does not take place, the plunger can recede excessively, and rattling of the chain and of the tensioning mechanism can occur. To address the problem of rattling due to excessive receding movement of the plunger during engine start-up, various devices have been proposed to restrict retracting movement of the plunger before pressure builds up in the oil in the high pressure oil chamber. In one such device, described in Japanese Patent No. 3929680, a ratchet is composed of a plurality of grooves formed on the outer periphery of the plunger and an engaging member provided on the tensioner housing. The engaging member cooperates with alternating concave and convex surfaces formed by the grooves to limit retraction of the plunger even when the supply of oil under pressure to the high pressure oil chamber of the tensioner is inadequate.

A problem with the above-described ratchet mechanism is that, because it also restricts retracting movement of the plunger caused by excessive tension in the chain resulting from changes in engine temperature and other causes, the chain can operate under excessive tension resulting in increased noise and damage to the chain.

The ratchet mechanism can be designed to allow a predetermined amount of backlash corresponding to an assumed maximum value of the retracting movement of the plunger caused by the excessive tension in the chain. However, as the allowed backlash is increased to accommodate increases in chain tension, a greater amount of rattling can occur on engine start-up.

If the engaging member of the ratchet mechanism is provided with a cam to alleviate the above problem, the cam will have a protruding portion on the outside of the tensioner housing, making the tensioner structure and shape complicated, and causing difficulties in the assembly, installation and maintenance of the tensioner.

Another problem is that it has been necessary to design the ratchet mechanism so that it has different characteristics depending on its conditions of use, and consequently, its production cost is increased.

SUMMARY OF THE INVENTION

Various aspects of the invention address the above-mentioned problems. Thus, objects of the several aspects of the invention include: reduction of production cost by simplifying the structure of the tensioner; reducing the load on the chain and the noise produced by operation of the chain without restricting the movement of the plunger in the retracting direction when caused the chain is under excessive tension; reducing rattling on starting the chain by reducing backlash; downsizing the tensioner; and facilitating assembly, removal and maintenance.

The chain tensioner according to the invention comprises a tensioner housing and a cylindrical plunger. The housing has a cylindrical plunger-accommodating hole having an inner wall, an open end, and a bottom opposite from the open end. The plunger is slidable in the plunger-accommodating hole and protrudes from said open end thereof. A plunger-biasing spring urges the plunger in a protruding direction. The tensioner includes a ratchet composed of a plurality of concave external grooves disposed around the outer periphery of the plunger. These external grooves are separated from one another by convex ridges, and a resilient ring within the tensioner housing for engaging surfaces of the grooves. An annular internal groove is formed in the inner wall of the plunger-accommodating hole adjacent its open end. At least a part of the resilient ring is disposed within the annular groove, and ring is expandable into the annular groove. The annular internal groove has opposed first and second surfaces engageable by the resilient ring. The first of said internal groove surfaces is inclined at a first angle with respect to a plane perpendicular to the protruding direction of the plunger and faces the bottom of the plunger-accommodating hole. The second internal groove surface is inclined at a second angle with respect to a plane perpendicular to the protruding direction and faces the open end of the plunger-accommodating hole. Each external groove on the plunger has opposed third and fourth surfaces engageable by the resilient ring. The third surfaces are inclined at a third angle with respect to a plane perpendicular to the protruding direction, and face the open end of the plunger-accommodating hole. The fourth surface is inclined at a fourth angle with respect to a plane perpendicular to the protruding direction and faces the bottom of the plunger-accommodating hole. The difference between the first and third angles is different from the difference between the second and fourth angles.

Because the resilient ring which performs a ratcheting function is disposed within the plunger-accommodating hole, the tensioner housing can be downsized.

Furthermore, the restricting forces exerted by the ratchet mechanism in the protruding and retracting directions can be determined readily and independently by selecting appropriate angles for the opposed surfaces of the internal groove in the tensioner housing. Accordingly, various requirements and conditions can be accommodated by a simple tensioner structure, and production costs can be reduced.

When the resilient ring is a C-ring, no protruding portion needs to be provided on the outside of the tensioner housing, and the ring can expand and contract within the internal groove in the tensioner housing. The use of a C-ring keeps the tensioner structurally simple, allows the tensioner housing to be downsized, allows the properties of the ratchet mechanism to be set readily and accurately, and reduces production costs.

In an alternative embodiment, the resilient ring can be an annular ring having one or more lever portions extending outwardly from its outer periphery. Because the resilient ring can be readily expanded or contracted by manipulating the lever portion or portions, assembly, removal and maintenance of the resilient ring can be more readily carried out.

The first and third angles can be set to allow the resilient ring to expand under the force exerted on the plunger by the biasing spring in the protruding direction so that the ring can expand into the annular internal groove and pass from an external concave groove on the plunger, and over a convex ridge of the plunger, into a next external concave groove, thereby allowing the plunger to move in the protruding direction. In this version of the tensioner, the backlash of the ratchet mechanism can be minimized, and rattling on starting of the chain can be reduced by narrowing the grooves of the plunger, and by narrowing the groove formed on the inside of the plunger-accommodating hole. The second and fourth angles can be set to prevent the resilient ring from expanding as a result of a force, less than a predetermined first force, applied to the plunger in its retracting direction. However, the second and fourth angles can allow the resilient ring to expand into the annular internal groove in the inner wall of the tensioner housing when a force greater than the first force is exerted on the plunger in the retracting direction. Consequently, the resilient ring can pass from an external concave groove on the plunger, and over a convex ridge of the plunger into a next external concave groove, thereby allowing the plunger to move in the retracting direction. Thus, the tensioner can be made to respond differently to different levels of forces exerted in the retracting direction. Accordingly, the plunger can be prevented from retracting on starting of the operation of a chain, but allowed to retract when tension in the chain becomes excessive. Therefore, it is possible to reduce a load on the chain and the noise produced by the chain, and to reduce the rattling on starting of the chain.

In accordance with another aspect of the invention, the tensioner housing can have a generally cylindrical outer peripheral surface at least from a location adjacent the open end to an intermediate location between the open end and an opposite end of the tensioner housing. The generally cylindrical portion can have external screw threads for mounting the tensioner housing. The external screw threads allow the tensioner housing to be downsized, and facilitate assembly and maintenance by allowing the tensioner to be installed in and removed from an engine without removal of a timing chain cover and without disassembly of other engine parts.

DETAILED DESCRIPTION OF THE PREFERRED EMBODIMENTS

Advantages of the invention can be realized in a variety of embodiments, as long as the angles of the surfaces of the plunger grooves, and the internal groove of the plunger-accommodating hole that cooperate with the resilient ring are selected to provide for different retracting and protruding properties.

Although it is preferable to form the tensioner housing and plunger from steel or cast iron, various other materials can be utilized. The plunger of the tensioner can be biased in the protruding direction by a resilient member such as a spring, a high-pressure hydraulic fluid such as engine oil, or a combination thereof.

Figure 1:
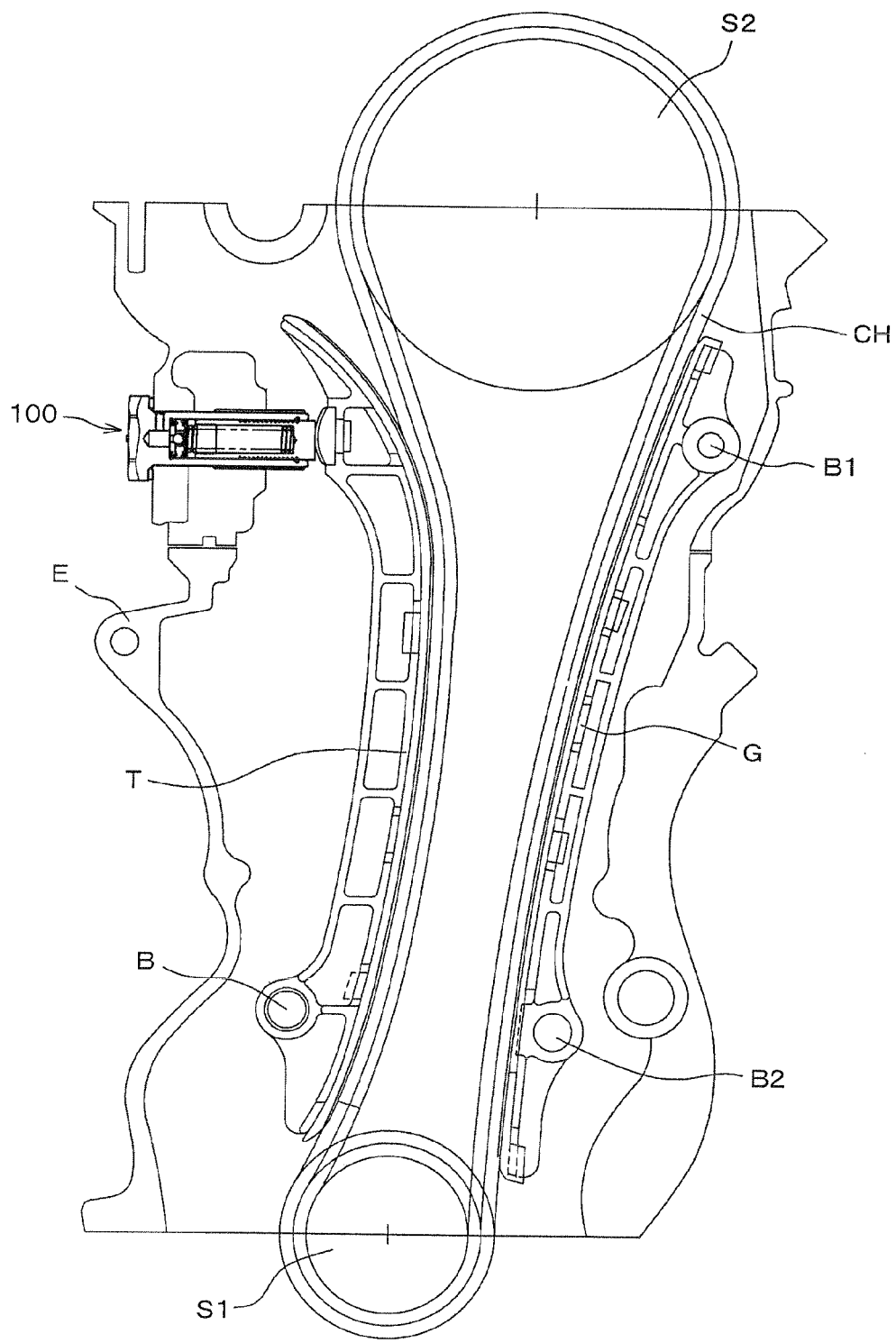
FIG. 1 is a schematic elevational view of an engine timing drive incorporating a chain tensioner in accordance with the invention.

The chain tensioner of the invention can be used in an engine timing system. As shown in FIG. 1, an endless transmission chain CH is driven by a crankshaft sprocket S1, and drives a camshaft sprocket S2. The tensioner 100 is mounted on an engine block E, and exerts tension in chain CH through a lever T pivoted on shaft B. The lever T is mounted by insertion, from the outside, into a mounting hole in engine block E, and guides chain CH while maintaining adequate tension in the chain. The chain is also guided by a fixed guide G, which is fixed to the engine block E by mounting shafts B1 and B2.

Figure 2:
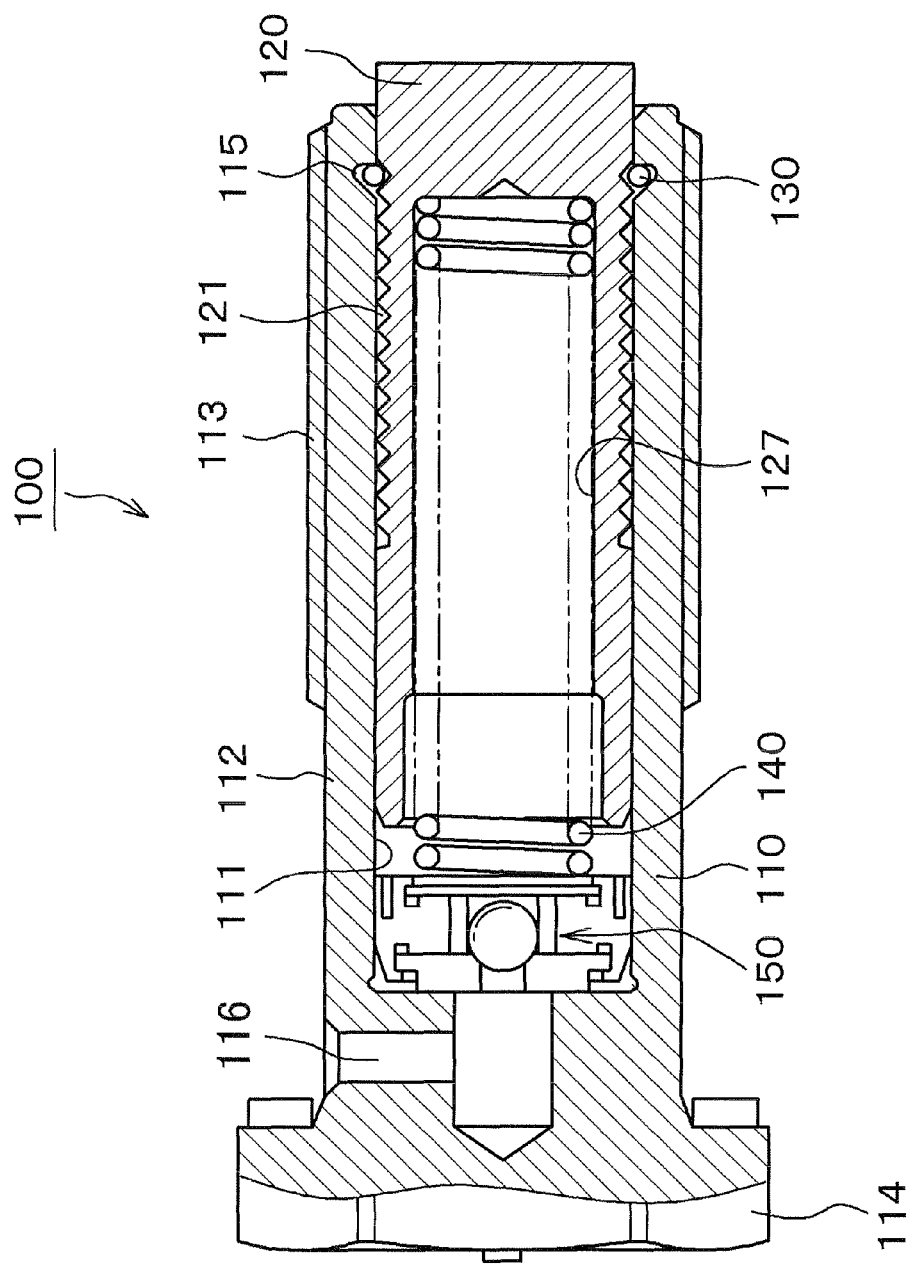
FIG. 2 is a longitudinal sectional view of a chain tensioner according to one embodiment of the invention.

As shown in FIG. 2, the chain tensioner 100 in accordance with a first embodiment of the invention comprises a tensioner housing 110, a cylindrical plunger 120, slidable in a plunger-accommodating hole 111 in the tensioner housing 110 and protruding therefrom, a coil spring 140 for biasing the plunger 120 in the protruding direction, and a check valve 150 for introducing oil under pressure into a high pressure oil chamber formed by the plunger and the housing, while blocking reverse flow of oil.

A resilient C-ring 130 is expandable into an annular groove 115 in the inner circumferential wall of the plunger-accommodating hole adjacent the open end thereof. This C-ring preferably is formed from a resilient wire or wire-like element having circular cross-sections throughout.

Opposite from the open end from which the plunger protrudes, the tensioner housing 110 is formed with a bolt head 114 by which the housing can be rotated for rotation by a wrench or other suitable tool. A mounting portion 112 of the housing is provided with external threads 113 for engagement with an internally threaded hole provided in the engine block E. Near the bolt head 114, the tensioner housing is also provided with an oil supply hole 116 through which oil can flow through the check valve 150 to the bottom of the plunger-accommodating hole 111.

The plunger 120 is hollow and is formed with a coil spring-accommodating hole 127 receiving one end of coil spring 140. The exterior of the plunger 120 formed with a series of concave grooves 121 separated from one another by convex ridges. The grooves, along with C-ring 130 form a ratchet mechanism for controlling the protruding and retracting movement of the plunger 120.

Figure 8:
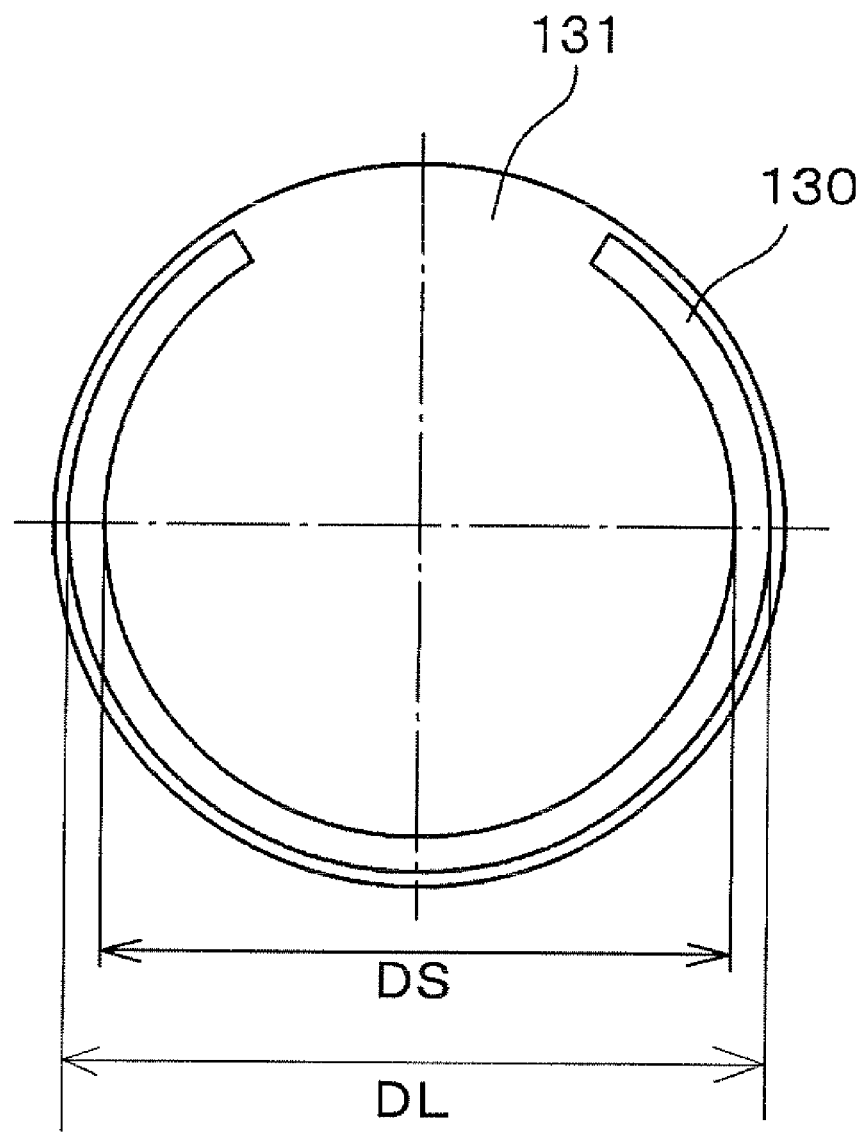
FIG. 8 is an elevational view showing a resilient ring of the chain tensioner according to the invention.

The C-ring 130, shown in FIG. 8, is formed of a resilient material in the form of a circle having a cut-away portion 131 allowing the ring to expand and contract. When the C-ring is in its relaxed condition, its outer diameter DL is greater than an inner diameter of the plunger-accommodating hole 111 of the tensioner housing 110, and its inner peripheral diameter DS is smaller than the outer diameter of the convex ridges between the grooves 121 of the plunger 120.

The tensioner 100 is arranged so that the plunger 120 is biased in the protruding direction by the coil spring 140 in the spring-accommodating hole 127 in order to maintain adequate tension of the chain.

The oil supplied under pressure through hole 116 and through the check valve 150 leaks through the small clearance between the plunger and the inner wall of the plunger-accommodating hole 111, thereby damping the reciprocal movement of the plunger 120 while biasing the plunger 120 in the protruding direction.

As shown in FIG. 1, the chain tensioner 100 is threadably mounted to an internally thread hole in the engine block E. The Protruding end of the plunger 120 maintains adequate tension in the chain CH by pressing the tensioner lever T against the chain.

Figure 3:
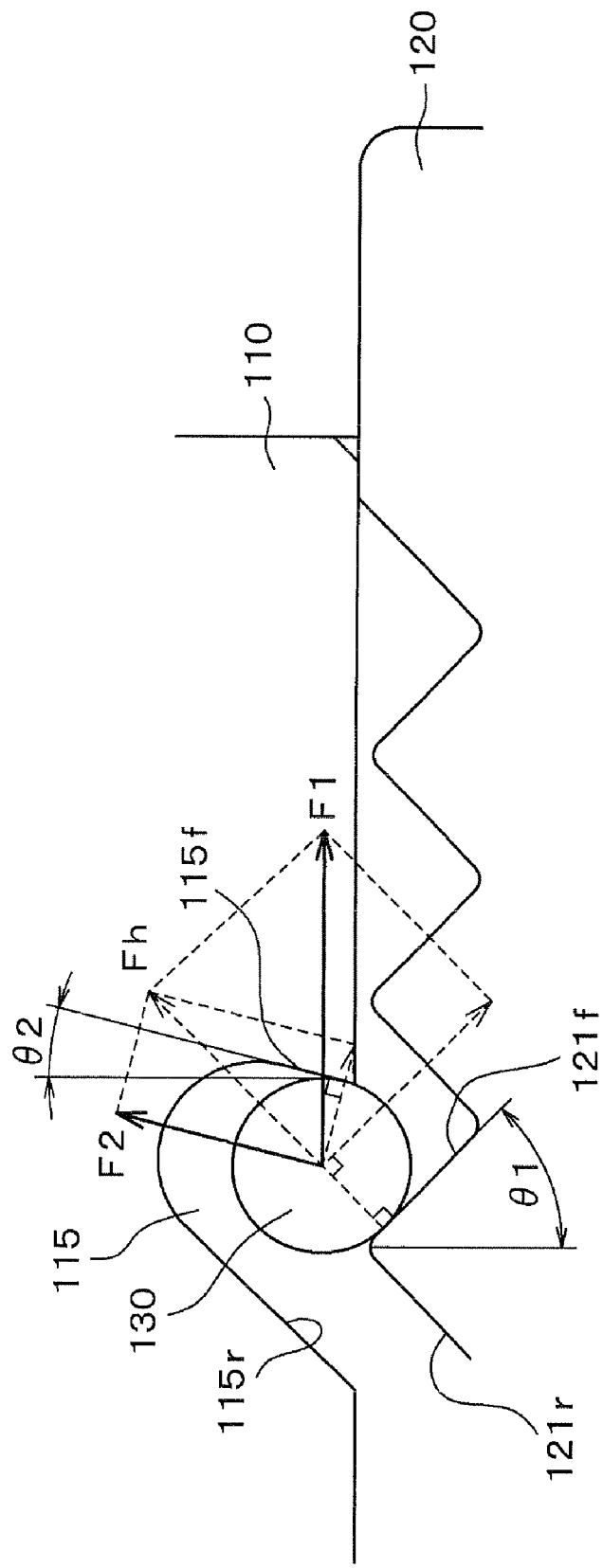
FIG. 3 is a schematic diagram showing the relationship of forces within the ratchet mechanism when a plunger is urged in the protruding direction.

As shown in FIG. 3, when the plunger 120 slides in the protruding direction, the C-ring 130 is pinched between a forwardly facing inclined surface 121$f$ of the a groove on the plunger and an undercut, rearwardly facing, inclined wall 115$f$ of the annular internal groove 115 of the tensioner housing 110.

A biasing force F1 is exerted on the ring 130 in the protruding direction by the forwardly facing surface 121$f$ of a groove on the plunger. The component Fh of force F1, in the direction normal to the surface 121$f$ at the line of contact between the ring 130 and groove surface 121$f$ is, in turn, the resultant of two components, one being perpendicular to inclined wall 115$f$ of the groove 115 at the line of contact between the ring 130 and wall 115$f$, and the other, component F2, being parallel to the inclined wall. Component F2 represents the outward force exerted on the ring in a direction parallel to the wall 115$f$, which tends to expand the ring.

The magnitude of the force component F2, acting to expand the C-ring 130, is determined by the relationship between angle θ1 of the forwardly facing inclined surface 121$f$ of the groove on the plunger 120 and angle θ2 of the rearwardly facing inclined wall 115$f$ of the groove 115 on the inner wall of the plunger-accommodating hole. These angles are measured relative to radial planes to which the direction of protruding and retracing movement of the plunger is perpendicular. In the embodiment shown, θ1 is considerably larger than θ2.

Figure 4:
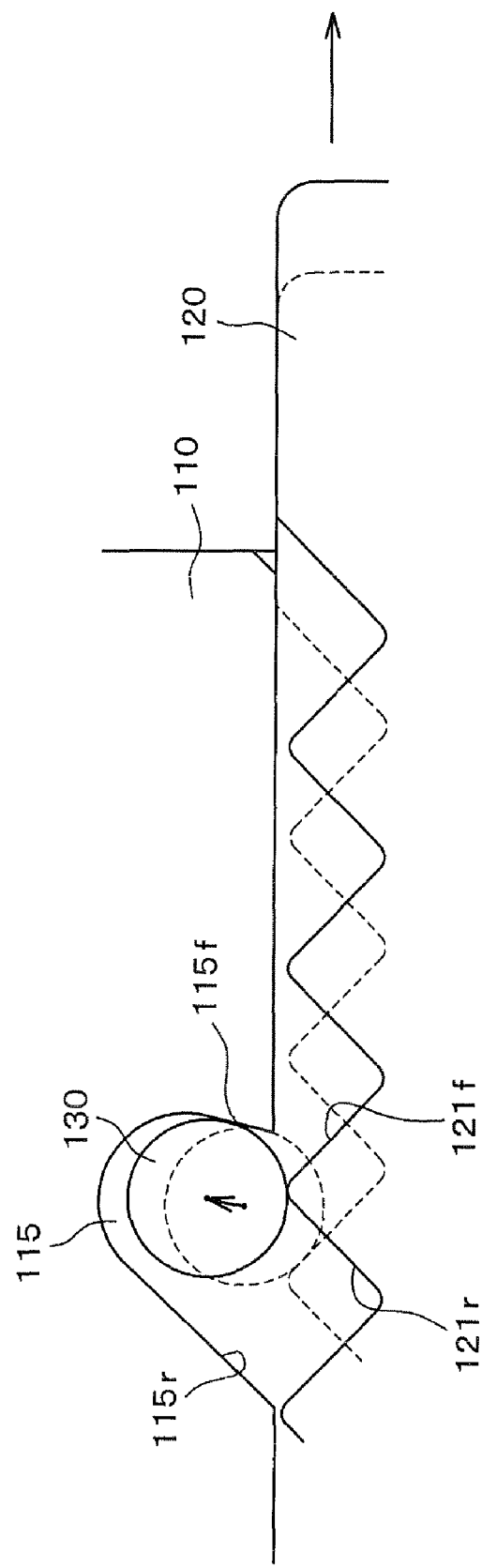
FIG. 4 is a schematic diagram illustrating the operation of the ratchet mechanism when a plunger is moving in the protruding direction.

When tension in the chain is insufficient, the biasing force F1 exerted by coil spring 140 (FIG. 2) urges the plunger in the protruding direction. Angles θ1 and θ2 are selected so that the force component F2 is sufficient to cause the C-ring 130 to expand until the convex ridge between adjacent grooves on the plunger passes through the C-ring as shown in FIG. 4, allowing the plunger 120 to protrude to a position at which adequate tension is applied to the chain.

Figure 5:
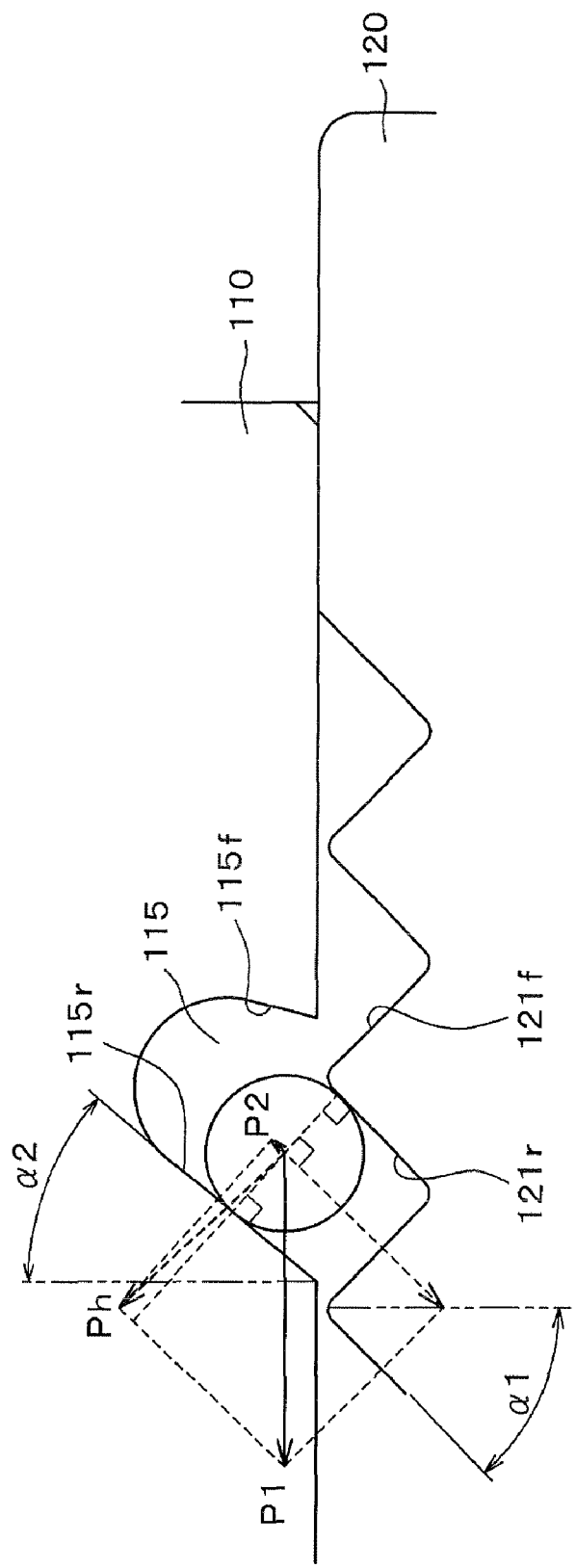
FIG. 5 is a schematic diagram showing the relationship of forces within the ratchet mechanism when a plunger is urged in the retracting direction.

As shown in FIG. 5, when the plunger 120 slides in the retracting direction, the C-ring 130 is pinched between the forwardly facing inclined surface 115$r$ of the internal groove 115 in the tensioner housing and a rearwardly facing inclined surface 121$r$ of a groove on the plunger.

A biasing force P1, in the retracting direction, is transmitted to the C-ring 130 by the rearwardly facing inclined surface 121$r$. A force component Ph is exerted in a direction normal to surface 115$r$ at the line of contact between the C-ring and surface 115$r$. When the force component Ph is transmitted by the C-ring 130 to the forwardly facing inclined surface 115$r$ of groove 115, another outward force component P2 is exerted on the ring in a direction parallel to the surface 115$r$. This outward force component tends to expand the C-ring 130

Figure 6:
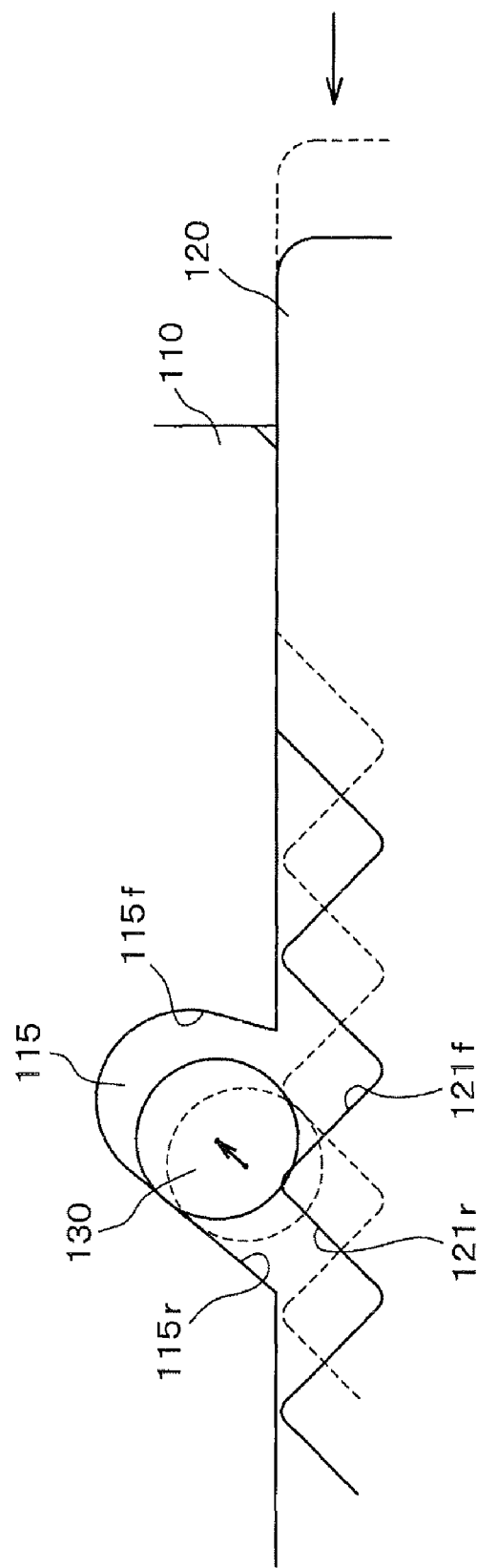
FIG. 6 is a schematic diagram illustrating the operation of the ratchet mechanism when a plunger is moving in the retracting direction.

The magnitude of the force component P2 tending to expand the C-ring 130 is determined by the relationship between angle α1 of the rearwardly facing inclined surface 121$r$ and angle α2 of the forwardly facing inclined surface 115$r$ of groove 115. Angle α1 should be at least slightly greater than angle α2 in order for component P2 to be directed outward. If the retracting direction force exerted on the plunger is small, force P1 will be small, force component P2 will be insufficient to expend the C-ring, and retracting movement of the plunger will be blocked by engagement of the C-ring with surfaces 115$r$ and 121$r$. On the other hand, if a larger force is exerted on the plunger in the retracting direction, force P1 will be larger and component P2 will become sufficient to expand the C-ring, allowing a ridge of the plunger to pass through the C-ring as illustrated in FIG. 6.

Accordingly, by appropriate selection of the relationship between angles α1 and α2, the biasing force P1 in the retracting direction, generated by excessive chain tension can result in expansion of the C-ring and passage of a ridge on the plunger through the C-ring so that the plunger can retract. At the same time, the plunger can be prevented from retracting when a lesser retracting force is exerted during the start of operation of the chain transmission.

In the tensioner described the difference between θ1 and θ2 is considerably greater than the difference between α1 and α2. Consequently, protruding movement of the plunger can take place relatively easily, while retracting movement is more restricted, and allowed only when the force exerted on the plunger in the retracting direction exceeds a predetermined value determined by the difference between angles α1 and α2. Thus, retraction of the plunger on start-up of the chain transmission is restricted to the amount of backlash allowed by the ratchet mechanism, but the plunger can retract when excessive chain tension is encountered in the operation of the chain transmission.

In summary, with the structure as illustrated in FIG. 5, it is possible to allow the plunger 120 to retract when excessive chain tension is encountered, thereby preventing excessive load on the chain and undesirable noises generated when the chain is under excessive load. At the same time it is possible to block the plunger 120 from moving in the retracting direction on starting of the chain transmission, and thereby reduce rattling noises.

The value of angle α1 of the forwardly facing inclined wall 115$r$, and the value of angle θ2 of the rearwardly facing inclined wall 115$f$ of groove 115 can be readily determined in the fabrication process, preferably by adjusting the configuration of groove 115. Accordingly, it is possible to obtain a chain tensioner having desired characteristics, using the common coil spring 140, C-ring 130, plunger 120 and tensioner housing 110, it being necessary only to adjust the configuration of groove 115.

Figure 7:
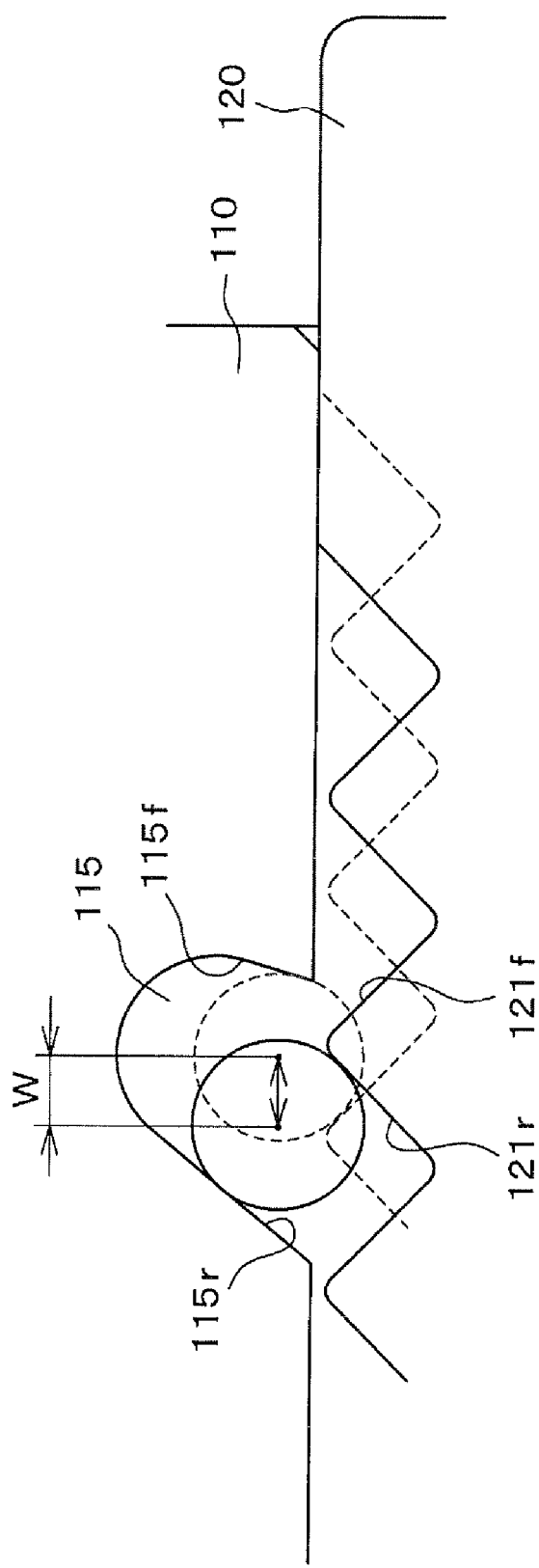
FIG. 7 is a schematic diagram illustrating backlash of the plunger in the chain tensioner of FIG. 2.

As shown in FIG. 7, the ratchet mechanism has a backlash distance W, corresponding to difference between the position of the C-ring when it contacts the rearwardly facing inclined surface 115ƒ of groove 115 and the position of the C-ring when it contacts the forwardly facing inclined surface 115r. It is possible to reduce the backlash distance W, and thereby achieve optimum ratchet operational characteristics, and at the same time reduce rattling on starting of the chain transmission.

Figure 9:
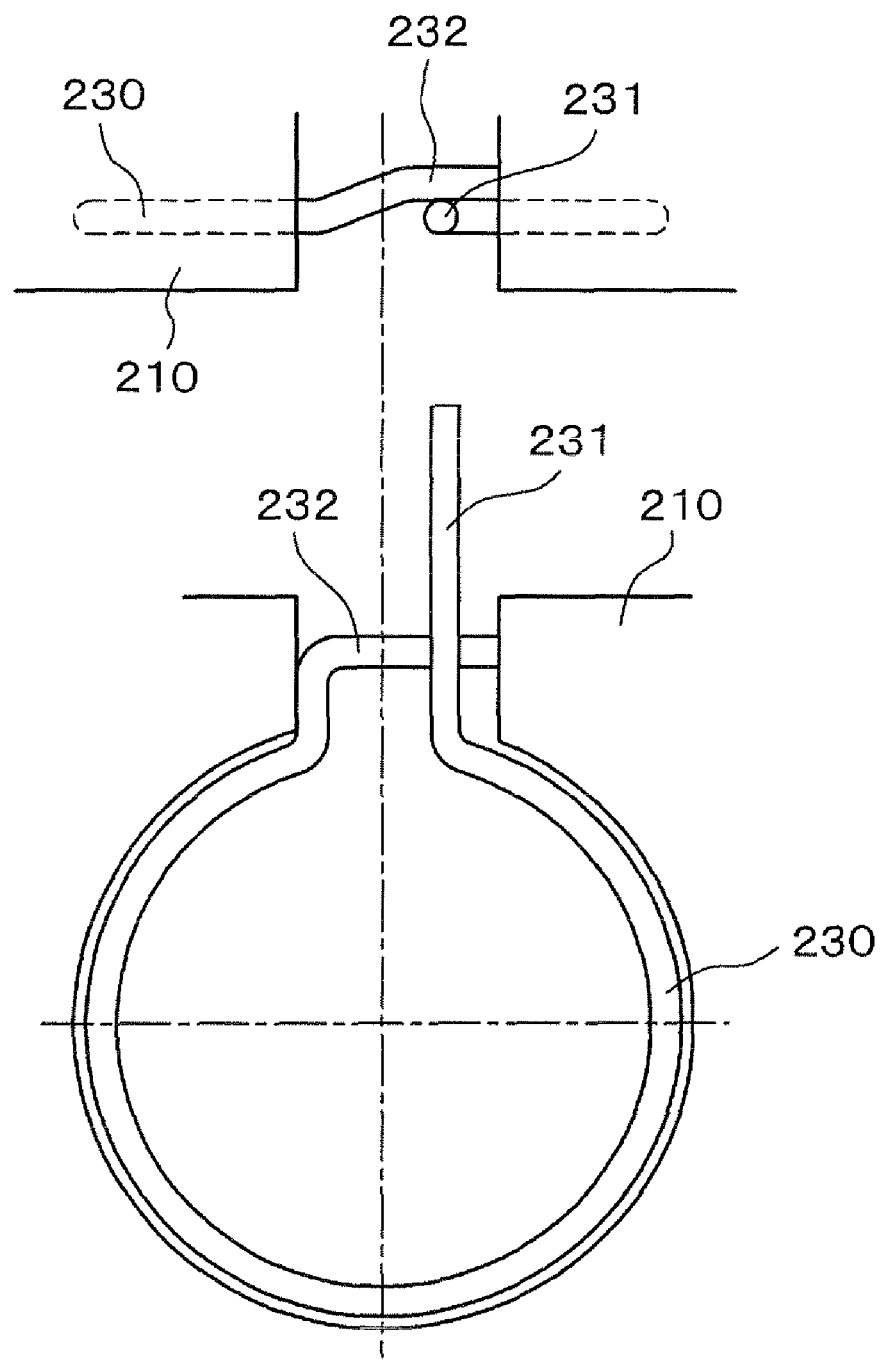
FIG. 9 is a schematic combined plan and elevational view showing a resilient ring of a chain tensioner according to another embodiment of the invention.

In the embodiment illustrated in FIG. 9, the resilient ring is composed of a resilient wire-like member having circular cross-sections and formed into an expandable and contractible annular portion 230 having lever portions 231 and 232 extending outwardly from the ends of the annular portion 230. A tensioner housing 210 is provided with a cut-out portion that communicates from a part of the outer periphery of the groove in which the annular portion is disposed to the exterior of the tensioner housing.

The outer and inner peripheral diameters of the annular part of ring 230 are formed in the same manner as in the case of C-ring 130 described above. One lever portion 231 extends through the cut-out of the housing to the outside, and the other lever portion 232 is formed into the shape of a letter L, with one leg extending across the cut-out as shown in FIG. 9 so that its movement is restricted by the opposite walls of the cut-out.

The annular ring 230 can be expanded or contracted by manipulating lever portion 231, which extending to the outside of the tensioner housing. The externally accessible lever facilitates assembly removal and maintenance of the ring.

Because the lever portion 231 extends to the outside of the tensioner housing 210, the tensioner cannot be readily installed by threading it into an engine block or timing chain cover. In this case, it is preferable to form the tensioner housing 210 so that it can be fixed to the engine in the same manner as in the case of a conventional chain tensioner.

Figure 10:
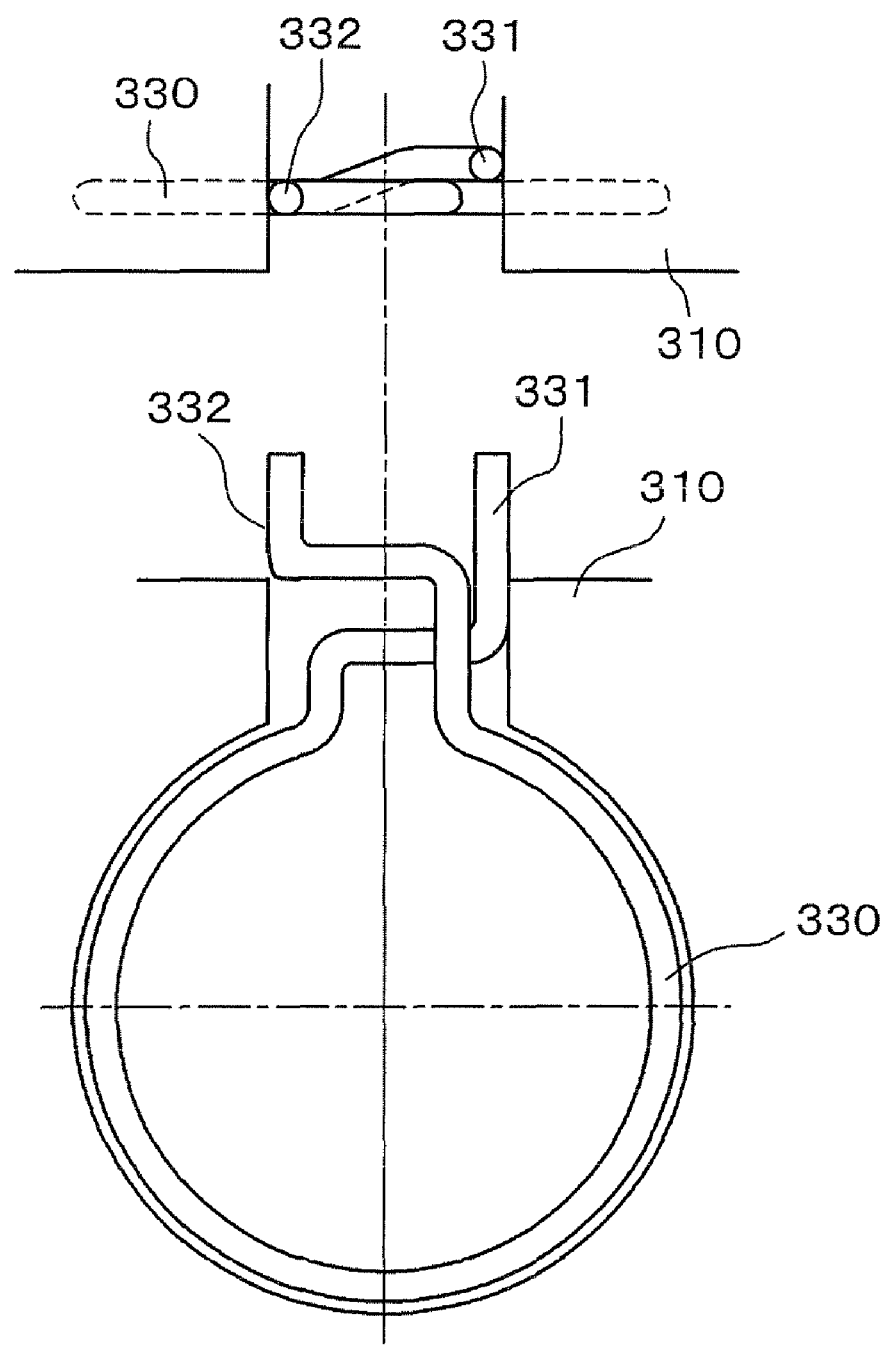
FIG. 10 is schematic combined plan and elevational view showing a resilient ring of a chain tensioner according to still another embodiment of the invention

In the embodiment shown in FIG. 10, the resilient ring is composed of an annular, expandable and contractible ring portion 330 formed of a resilient wire or wire-like material having circular cross sections. Lever portions 331 and 332 extended outward from the ring portion, and the tensioner housing 310 is provided with a cut-out as in the case of the embodiment of FIG. 9, that communicates from a part of the outer periphery of the groove in which the annular portion is disposed to the exterior of the tensioner housing. Here, the outer and inner peripheral diameters of the annular part of the ring 330 are formed in the same manner as in the case of the C-ring 130 described above. In this case, each of the two lever portions 331 and 332 is bent, in the middle of the cut-out, into the shape of a crank, and ends thereof extend to the outside of the tensioner housing 310 and bear against opposite walls of the cut-out, thereby restricting contraction of the ring. The parts bent into the shape of a crank extend part-way across the cut-out to allow expansion of the ring by manipulation of both lever portions 331 and 332. However expansion of the ring is limited by engagement of the inner parts of the crank-shaped lever portions with the opposite walls of the cut-out.

The annular ring 330 may be simply expanded by manipulating the outwardly protruding ends of both lever portions 331 and 332 facilitating assembly, removal, and maintenance of the ring.

As in the case of the embodiment in FIG. 9, in the embodiment of FIG. 10, it is preferable to form the tensioner housing 210 so that it can be fixed to the engine in the same manner as in the case of a conventional chain tensioner.

The several embodiments described have the advantages of reducing the production cost of a tensioner by simplifying its structure, reduction of load on the chain, reduction of noise without restricting movement of the plunger in the retracting direction caused by an excessive tension of the chain, reduction in rattling on starting the chain transmission by reducing backlash, and facilitating downsizing, assembly, removal, and maintenance.

In the embodiments described, oil introduced into the tensioner housing is used only for damping the movement of the plunger, and has little if any effect on the protruding direction biasing force exerted on the plunger. However, it is also possible to utilize the oil pressure to exert a biasing force on the plunger for optimum operation of the ratchet mechanism.

What is claimed is:

1. In an engine having a timing drive comprising an endless timing chain, a chain tensioner arranged to maintain tension in said chain, the chain tensioner comprising:

a tensioner housing having a cylindrical plunger-accommodating hole having an inner wall, an open end, and a bottom opposite from said open end;

a cylindrical plunger slidable in the plunger-accommodating hole and protruding from said open end thereof;

a plunger-biasing spring urging said plunger in a protruding direction; and a ratchet composed of a plurality of concave external grooves disposed around the outer periphery of the plunger, said external grooves being separated from one another by convex ridges, and a resilient ring within the tensioner housing for engaging surfaces of said grooves;

an annular internal groove formed in the inner wall of the plunger-accommodating hole adjacent said open end thereof, at least a part of the resilient ring being disposed within the annular groove and said ring being expandable into the annular groove;

wherein said annular internal groove has opposed first and second surfaces engageable by said resilient ring, the first of said internal groove surfaces being inclined at a first angle with respect to a plane perpendicular to said protruding direction and facing said bottom of the plunger-accommodating hole, and the second of said internal groove surfaces being inclined at a second angle with respect to a plane perpendicular to said protruding direction and facing the open end of the plunger-accommodating hole;

wherein each said external groove on the plunger has opposed third and fourth surfaces engageable by said resilient ring, said third surfaces being inclined at a third angle with respect to a plane perpendicular to said protruding direction and facing the open end of the plunger-accommodating hole, and the said fourth surface being inclined at a fourth angle with respect to a plane perpendicular to said protruding direction and facing the bottom of the plunger-accommodating hole;

wherein the difference between the first and third angles is different from the difference between the second and fourth angles; and wherein said fourth angle exceeds the second angle by a limited amount such that the resilient ring is prevented, by contact with said second and fourth surfaces, from expanding sufficiently to move from an external concave groove on the plunger and over a convex ridge of the plunger into a next external concave groove as a result of the force applied by said chain to the plunger during starting of the engine, but wherein said fourth angle exceeds the second angle by an amount sufficient that, when a predetermined force, greater than the maximum force exerted on said plunger during starting of the engine is exerted on the plunger during engine operation, the resilient ring is caused to expand, by contact with said second and fourth surfaces, into said annular internal groove so that said resilient ring passes from an external concave groove on the plunger, and over a convex ridge of the plunger into a next external concave groove, thereby allowing the plunger to move in said retracting direction, whereby the plunger is prevented from retracting on starting of the engine, but allowed to retract when tension in the chain becomes excessive during engine operation.

2. The chain tensioner according to claim 1, wherein said resilient ring is a C-ring.

3. The chain tensioner according to claim 1, wherein said resilient ring is an annular ring having an outer periphery and includes one or more lever portions extending outwardly from said outer periphery.

4. The chain tensioner according to claim 1, wherein said first and third angles are set to allow said resilient ring to expand under the force exerted on the plunger by the biasing spring in said protruding direction so that the ring can expand into said annular internal groove and pass from an external concave groove on the plunger, and over a convex ridge of the plunger into a next external concave groove, thereby allowing the plunger to move in a said protruding direction.

5. The chain tensioner according to claim 1, wherein said tensioner housing has a generally cylindrical outer peripheral surface at least from a location adjacent said open end thereof to an intermediate location between said open end and an opposite end of the tensioner housing, said generally cylindrical portion having external screw threads, for mounting the tensioner housing.

6. In an engine having a timing drive comprising an endless timing chain, a chain tensioner arranged to maintain tension in said chain, the chain tensioner comprising:

a tensioner housing having a cylindrical plunger-accommodating hole having an inner wall, an open end, and a bottom opposite from said open end;

a cylindrical plunger slidable in the plunger-accommodating hole and protruding from said open end thereof;

a plunger-biasing spring urging said plunger in a protruding direction; and a ratchet composed of a plurality of concave external grooves disposed around the outer periphery of the plunger, said external grooves being separated from one another by convex ridges, and a resilient ring within the tensioner housing for engaging surfaces of said grooves;

an annular internal groove formed in the inner wall of the plunger-accommodating hole adjacent said open end thereof, at least a part of the resilient ring being disposed within the annular groove and said ring being expandable into the annular groove;

wherein said annular internal groove has opposed first and second surfaces engageable by said resilient ring, the first of said internal groove surfaces being inclined at a first angle with respect to a plane perpendicular to said protruding direction and facing said bottom of the plunger-accommodating hole, and the second of said internal groove surfaces surface being inclined at a second angle with respect to a plane perpendicular to said protruding direction and facing the open end of the plunger-accommodating hole;

wherein each said external groove on the plunger has opposed third and fourth surfaces engageable by said resilient ring, said third surfaces being inclined at a third angle with respect to a plane perpendicular to said protruding direction and facing the open end of the plunger-accommodating hole, and the said fourth surface being inclined at a fourth angle with respect to a plane perpendicular to said protruding direction and facing the bottom of the plunger-accommodating hole; and wherein the difference between the first and third angles is different from the difference between the second and fourth angles;

wherein said first and third angles are set to allow said resilient ring to expand under the force exerted on the plunger by the biasing spring in said protruding direction so that the ring can expand into said annular internal groove and pass from an external concave groove on the plunger, and over a convex ridge of the plunger into a next external concave groove, thereby allowing the plunger to move in a said protruding direction; and wherein said fourth angle exceeds the second angle by a limited amount such that the resilient ring is prevented, by contact with said second and fourth surfaces, from expanding sufficiently to move from an external concave groove on the plunger and over a convex ridge of the plunger into a next external concave groove as a result of the force applied by said chain to the plunger during starting of the engine, but wherein said fourth angle exceeds the second angle by an amount sufficient that, when a predetermined force, greater than the maximum force exerted on said plunger during starting of the engine is exerted on the plunger during engine operation, the resilient ring is caused to expand, by contact with said second and fourth surfaces, into said annular internal groove so that said resilient ring passes from an external concave groove on the plunger, and over a convex ridge of the plunger into a next external concave groove, thereby allowing the plunger to move in said retracting direction, whereby the plunger is prevented from retracting on starting of the engine, but allowed to retract when tension in the chain becomes excessive during engine operation.

7. The chain tensioner according to claim 6, wherein said resilient ring is a C-ring.

8. The chain tensioner according to claim 6, wherein said resilient ring is an annular ring having an outer periphery and includes one or more lever portions extending outwardly from said outer periphery.

9. The chain tensioner according to claim 6, wherein said tensioner housing has a generally cylindrical outer peripheral surface at least from a location adjacent said open end thereof to an intermediate location between said open end and an opposite end of the tensioner housing, said generally cylindrical portion having external screw threads, for mounting the tensioner housing.

* * * * *